US 8,312,078 B2

(12) United States Patent
Yoshida

(10) Patent No.: US 8,312,078 B2
(45) Date of Patent: Nov. 13, 2012

(54) DATA TRANSFER SYSTEM AND DATA TRANSFER METHOD

(75) Inventor: Shinichiro Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 258 days.

(21) Appl. No.: 12/831,550

(22) Filed: Jul. 7, 2010

(65) Prior Publication Data

US 2011/0010417 A1 Jan. 13, 2011

(30) Foreign Application Priority Data

Jul. 8, 2009 (JP) .................................. 2009-162199

(51) Int. Cl.
*G06F 15/16* (2006.01)
(52) U.S. Cl. ........ 709/203; 709/201; 709/212; 709/224; 709/226; 709/229
(58) Field of Classification Search .................. 709/201, 709/203, 212, 224, 226, 229
See application file for complete search history.

(56) References Cited

U.S. PATENT DOCUMENTS

| 5,594,426 A * | 1/1997 | Ushijima et al. ............... 340/3.1 |
| 5,752,078 A * | 5/1998 | Delp et al. ......................... 710/7 |
| 2002/0133561 A1* | 9/2002 | O'Brien et al. ................ 709/213 |
| 2002/0188646 A1* | 12/2002 | Terrill et al. .................... 709/101 |
| 2005/0165997 A1* | 7/2005 | Sakaki et al. .................. 710/313 |
| 2006/0093119 A1* | 5/2006 | Wilson et al. ............. 379/211.02 |

FOREIGN PATENT DOCUMENTS

| JP | 2008210115 A | 9/2008 |
| JP | 2008287453 A | 11/2008 |

* cited by examiner

*Primary Examiner* — Liangche A Wang

(57) ABSTRACT

A data transfer system includes: a local unit (LU) that transmits data from the USB device connected to a local computer (LC) to a remote computer (RC); and a remote unit (RU) that acquires the data from LC and transfers the data to an application. LU includes: a unit that receives the data from the USB device to store the data in a memory, and notifies the USB device about the reception: and a unit that reads non-transferred data, converts the data to a network format, and transfers the data to RC when the amount of non-transferred data stored in the memory is equal to or greater than a threshold. RU includes: a unit that receives the data from LC and stores the data in a memory: and a unit that reads the unread data in the memory and transmits the data in an application format.

2 Claims, 3 Drawing Sheets

DATA TRANSFER SYSTEM AND DATA TRANSFER METHOD

CROSS-REFERENCES

This application is based upon and claims the benefit of priority from Japanese Application No. 2009-162199, filed on Jul. 8, 2009, the disclosure of which is incorporated herein in its entirety by reference.

TECHNICAL FIELD

The present invention relates to a data transfer system and a data transfer method.

BACKGROUND ART

Recent development of networks has expanded a framework in which a user logs via a network into a remote computer located at a distance from the user's local computer and performs operations on the remote computer, as represented by a thin client.

In such a framework, a mode is assumed in which a USB device is connected to the local computer and this USB device is recognized for use on the remote computer. For example, when a USB camera is used that can fetch dynamic images in a computer (PC) by USB connection, direct connection of the USB camera to the remote computer located at a distance is not easy. Therefore, most users wish to connect the camera to their own local computer and use it on the remote computer.

A technique called "USB Redirect" is known for recognizing and using such a USB device connected to the local computer on a remote computer (Japanese Patent Application Laid-Open No. 2008-210115). Further, there also exists a technique called "USB Device Server" by which a USB device is connected to a special device server, rather than a local computer, and this connected USB device can be used from another computer (Japanese Patent Application Laid-Open No. 2008-287453).

However, with the above-described USB Redirect technique, data in a USB protocol format and data in a network protocol format have to be converted into each other each time data communication with the USB device is performed. The resultant problem is a decrease in communication performance caused by communication delay and overhead. With many of USB devices exchanging data within a short time and with a high frequency, this problem becomes evident, in particular, for a USB camera that exchanges data real-time.

Further, the aforementioned USB device server is configured to be compatible with only a specific USB device such as a storage or a printer and to be dependent on an OS. Therefore, such a server has difficulty being applied to the USB device such as a USB camera that exchanges data real-time.

SUMMARY

An exemplary object of the invention is to provide a new data transfer system and a new data transfer method that do not require the use of a special device server and can reduce the decrease in communication performance caused by communication delay and overhead.

A data transfer system according to an exemplary aspect of the invention includes: a local control unit for acquiring data from a USB device connected to a local computer and transmitting the acquired data to a remote computer via a communication network: and a remote control unit for acquiring the data transmitted from the local control unit and transferring the acquired data to an application operating on the remote computer, wherein the local control unit includes: a device control unit for receiving the data transmitted from the USB device to store the received data in a memory related to the local computer; and notifying, in response to the reception, the USB device about the successful reception, and a transfer control unit for determining whether an amount of the non-transferred data that are stored in the memory related to the local computer is equal to or greater than a threshold and, when the amount of the non-transferred data is equal to or greater than the threshold, reading the non-transferred data that are stored in the memory related to the local computer, converting the read data to a format corresponding to the communication network, and transferring the converted data to the remote computer and the remote control unit includes: a reception unit for receiving the data transmitted from the transfer control unit to store the received data in a memory related to the remote computer; and a read control unit for reading the unread data that are stored in the memory related to the remote computer in response to a request from the application operating on the remote computer and transmitting the read data to the application in a format that can be processed by the application.

A local control unit according to an exemplary aspect of the invention is configured to acquire data from a USB device connected to a local computer and transmit the acquired data to a remote computer via a communication network and includes a device control unit for receiving the data transmitted from the USB device to store the received data in a memory related to the local computer, and notifying, in response to the reception, the USB device about the successful reception, and a transfer control unit for determining whether an amount of the non-transferred data that are stored in the memory related to the local computer is equal to or greater than a threshold and, when the amount of the non-transferred data is equal to or greater than the threshold, reading the non-transferred data that are stored in the memory related to the local computer, converting the read data to a format corresponding to the communication network, and transferring the converted data to the remote computer.

A remote control unit according to an exemplary aspect of the invention is configured to acquire data from an USB device connected to a local computer via a communication network and transfer the acquired data to an application operating on a remote computer and includes: a reception unit for receiving the data transmitted from the local computer to store the received data in a memory related to the remote computer, and a read control unit for reading the unread data that are stored in the memory related to the remote computer in response to a request from the application operating on the remote computer and transmitting the read data to the application in a format that can be processed by the application.

A data transfer method according to an exemplary aspect of the invention includes: acquiring, in a local computer, data from a USB device connected to the local computer and transmitting the acquired data to a remote computer via a communication network: and acquiring, in the remote computer, the data transmitted from the local computer and transferring the acquired data to an application operating on the remote computer, wherein the acquiring in the local computer includes: receiving the data transmitted from the USB device to store the received data in a memory related to the local computer, and notifying, in response to the reception, the USB device about the successful reception, and determining whether an amount of the non-transferred data that are stored in the memory related to the local computer is equal to or greater than a threshold and, when the amount of the non-transferred data is equal to or greater than the threshold, reading the non-transferred data that are stored in the memory related to the local computer, converting the read data to a format corresponding to the communication network, and transferring the converted data to the remote computer, and the acquiring in the remote computer includes: receiving the data transmitted from the local computer to store the received data in a memory related to the remote computer: and reading the unread data that are stored in the memory related to the remote computer in response to a request from the application and transmitting the read data to the application in a format that can be processed by the application.

The data transfer method according to an exemplary aspect of the invention can be executed by CPU provided in a local computer and a remote computer.

A computer usable medium according to an exemplary aspect of the invention is a medium having computer readable code means embodied therein for executing said acquiring in the local computer in the data transfer method.

A computer usable medium according to an exemplary aspect of the invention is a medium having computer readable code means embodied therein for executing said acquiring in the remote computer in the data transfer method.

The computer readable code means can be installed or loaded to each computer via the computer usable medium such as a CD-ROM, a magnetic disk or a semiconductor memory.

In the present description the term "unit" includes a unit realized by hardware, a unit realized by software, and a unit realized by both the hardware and the software. One unit can be realized by using two or more types of hardware, and two or more units can be realized by one type of hardware.

EXEMPLARY EMBODIMENT

A data transfer system according to an exemplary embodiment will be explained below with reference to the appended drawings.

Figure 1:
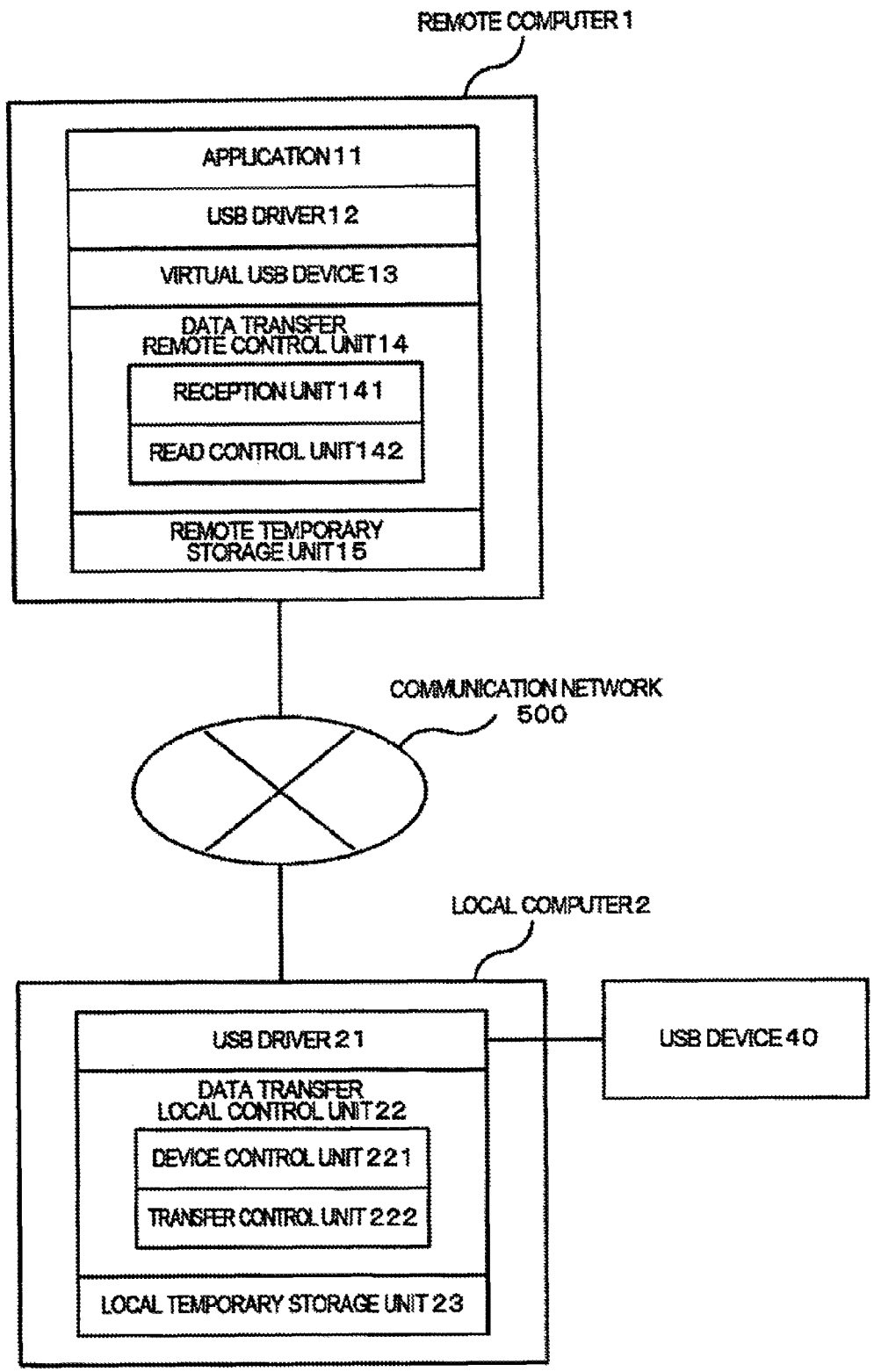
FIG. 1 shows a schematic configuration of a data transfer system 100 of an embodiment of the present invention.

FIG. 1 illustrates a schematic configuration of the data transfer system. As shown in FIG. 1, the data transfer system 100 includes a remote computer 1, a local computer 2, and a USB device 40. The remote computer 1 and the local computer 2 are connected via a communication network 500 such as internet, and the local computer 2 and the USB device 40 are connected by USB.

The remote computer 1 is provided with functional units such as an application 11, a USB driver 12, a virtual USB device 13, a data transfer remote control unit 14, and a remote temporary storage unit 15. The remote computer 1 can be constituted by using a special or general use computer including hardware such as a CPU (central processing unit) composed of a microprocessor, a memory (ROM, RAM) bus— coupled to the CPU, a HDD, and various interfaces. The above-described functional units are mainly realized by the CPU executing the programs stored in the memory, HDD, or the like and controlling the hardware.

The application 11 operates on the remote computer 1 and uses data transferred from the USB device 40. The application is, for example, a dynamic image viewer.

The USB driver 12 is a unit for providing the application 11 with various functions for accessing the USB device. This driver is similar to the conventional USB driver.

The virtual USB device 13 is a unit for simulating the input and output of the USB device 40 according to the USB protocol. The virtual USB device 13 is realized based on the USB protocol serving as one application that operates on the remote computer 1.

According to the framework of the exemplary embodiment, the data transfer remote control unit 14 is a unit configured to acquire data transmitted from the local computer 2 and transfer the acquired data to the virtual USB device 13. The data transfer remote control unit 14 is provided with a reception unit 141 for receiving the data transmitted from the local computer 2 and storing the data in the remote temporary storage unit 15 and a read control unit 142 for reading the unread data stored in the remote temporary storage unit 15 in response to the request from the application operated by the remote computer 1 and transmitting the data to the application in a format that can be processed by the application.

The remote temporary storage unit 15 is a unit for temporary storing the data of the USB device 40 and is realized using a storage unit related to the remote computer 1, such as a memory or HDD provided in the remote computer 1, or an external storage device that can be accessed by the remote computer 1.

The local computer 2 is provided with functional units such as a USB driver 21, a data transfer local control unit 22 and a local temporary storage unit 23. The local computer 2 can be constituted by using a special or general use computer including hardware such as a CPU (central processing unit) composed of a microprocessor, a memory (ROM, RAM) bus-coupled to the CPU, a HDD, and various interfaces. The above-described functional units are mainly realized by the CPU executing the programs stored in the memory, HOD, or the like and controlling the hardware.

The USB driver 21 is a unit for providing an application operating on the local computer 2 (including the data transfer local control unit 22) with various functions for accessing the USB device. This driver is similar to the conventional USB driver.

According to the framework of the exemplary embodiment, the data transfer local control unit 22 is a unit configured to acquire data from the USB device 40 and transmit the acquired data to the remote computer 1 via the communication network 500. The data transfer local control unit 22 is provided with a device control unit 221 for receiving the data transmitted from the USB device 40 to store the received data in the local temporary storage unit 23 and notifying, in response to the reception, the USB device 40 about the successful reception, and a transfer control unit 222 for determining whether the amount of non-transferred data stored in the local temporary storage unit 23 is equal to or greater than a threshold and, when the amount of non-transferred data is equal to or greater than the threshold, reading the non-transferred data stored in the local temporary storage unit 23, converting the data to a format adapted to the communication network 500, and transferring the data to the remote computer 1.

The local temporary storage unit 23 is a unit for temporary storing the data of the USB device 40 and realized using a storage unit related to the local computer 2, such as a memory or HDD provided in the remote computer 2, or an external storage device that can be accessed by the remote computer 2.

Figure 2:
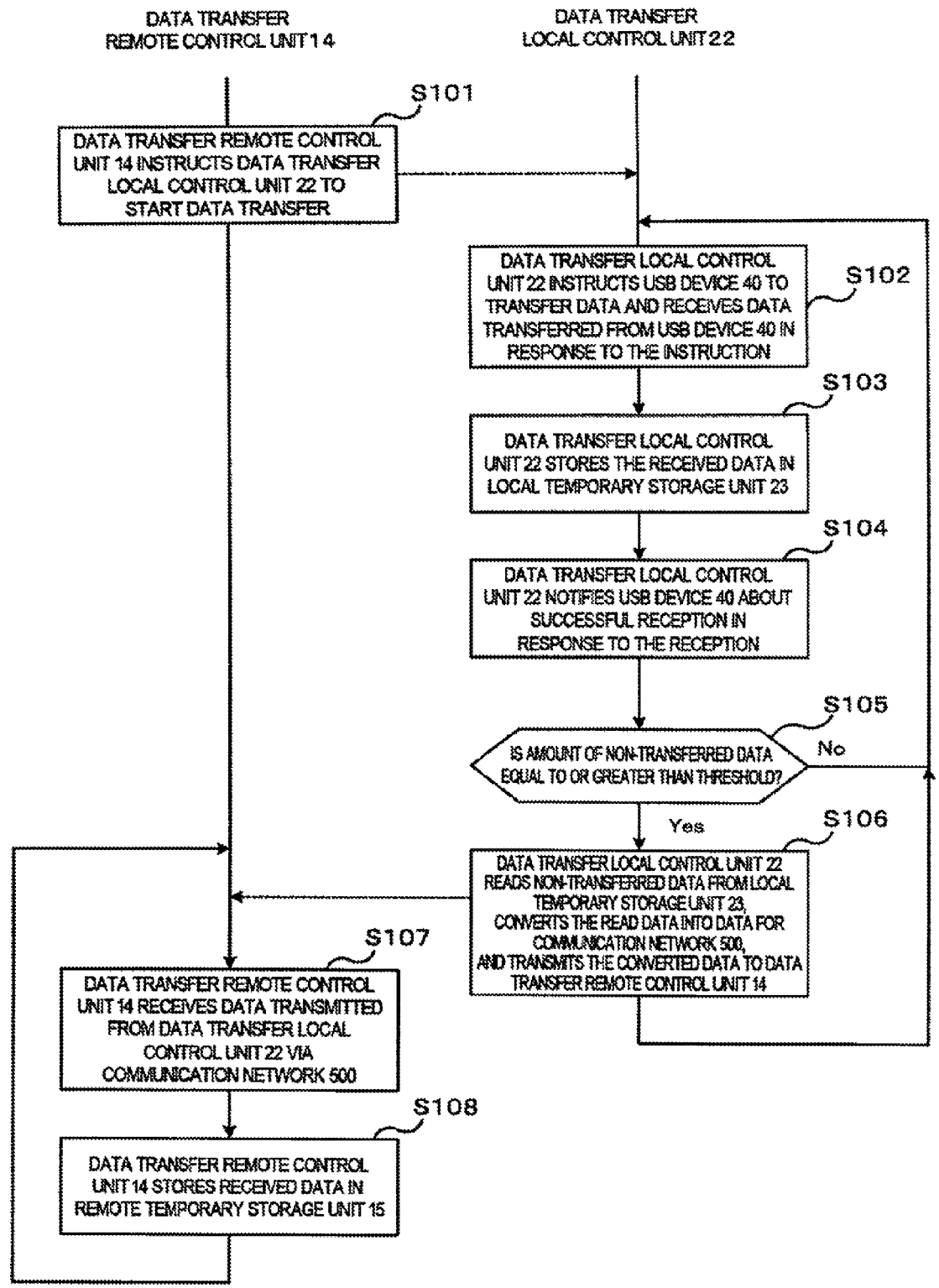
FIG. 2 illustrates data transfer processing.
Figure 3:
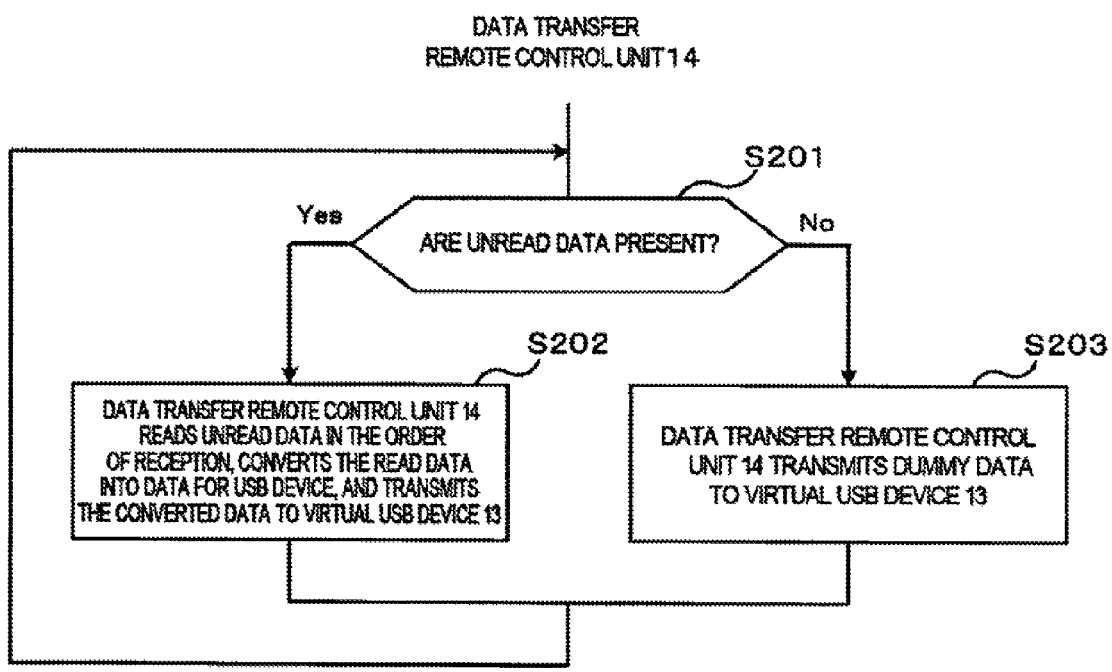
FIG. 3 illustrates data transfer processing.

The operations performed when data of the USB device 40 are transferred to the remote computer 1 by using the framework of the exemplary embodiment will be explained below with reference to FIG. 2 and FIG. 3. In the present description, these steps (including partial steps that are not assigned with reference symbols) indicated in flowcharts or the like can be executed in parallel or by randomly changing the order thereof within a range that does not contradict the processing contents.

First, preprocessing of data transfer will be explained.

Where the USB device 40 is connected to a USB port of the local computer 2, the USB driver 21 detects this connection. The connection may be detected, for example, by detecting whether any of signal lines (D+, D−) in the USB cable is at a predetermined voltage (3.3 V).

When the USB driver 21 detects the connection, an operation necessary to perform data transfer with the USB device 40 is executed according to the USB standard. As a result, a transition is made to a state in which data transfer with the USB device 40 can be performed via the USB driver 21.

The data transfer local control unit 22 monitors the connection detection performed by the USB driver 21 and executes an operation necessary to preform data transfer with the data transfer remote control unit 14 according to the communication protocol of the communication network 500 when the connection is detected by the USB driver 21. As a result, a transition is made to a state in which the data transfer local control unit 22 and the data transfer remote control unit 14 can perform data transfer therebetween via the communication network 500.

The first data transfer processing will be explained below (see FIG. 2).

Where the application 11 issues a data acquisition instruction of the USB device 40 to the virtual USB device 13 via the USB driver 12, a transition is made to a state in which data can be transferred according to the USB protocol between the application 11 and the virtual USB device 13. Then, the virtual USB device 13 sends a data read request to the data transfer remote control unit 14. The first data transfer processing is thereby started.

The data transfer remote control unit 14 that has received the read request instructs the data transfer local control unit 22 via the communication network 500 to start data transfer (S101).

The data transfer local control unit 22 that has received this instruction instructs the USB device 40 via the USB driver 21 to transfer data and receives data transferred from the USB device 40 in response to this instruction (S102).

The data transfer local control unit 22 then stores the received data in the local temporary storage unit 23 (S103) and notifies the USB device 40 about the successful reception as a response to the reception (S104).

Then, the data transfer local control unit 22 finds the amount (data size) of data (non-transferred data) that have not yet been transferred to the data transfer remote control unit 14 with respect to the data stored in the local temporary storage unit 23 and determines whether the found data amount is equal to or greater than a threshold (S105). The threshold can be set correspondingly to the storage capacity of the local temporary storage unit 23 or a line speed of the communication network 500.

When the found amount is less than the threshold, the data transfer local control unit 22 recurses on S102 till a data transfer end instruction arrives.

When the found amount is equal to or greater than the threshold, the data transfer local control'unit 22 reads the non-transferred data from the local temporary storage unit 23, converts the data to data for the communication network 500 according to the communication protocol of the communication network 500, sends the converted data to the data transfer remote control unit 14 (S106), and then recurses on S102 till a data transfer end instruction arrives.

Where the data transfer remote control unit 14 receives the data transmitted from the data transfer local control unit 22 via the communication network 500 (S107), the data transfer remote control unit 14 stores the received data in the remote temporary storage unit 15 (S108) and then recurses on S107 till a data transfer end instruction arrives.

The second data transfer processing will be described below (see FIG. 3). The second data transfer processing is executed after S101 has been executed and can be executed in parallel with the processing of S102 and subsequent steps.

The data transfer remote control unit 14 determines whether there are data that have not yet been read (unread data) (S201) with respect to the data of the USB device 40 stored in the remote temporary storage unit 15 at a transfer timing that is set based on the USB protocol.

When there are unread data, the data transfer remote control unit 14 reads the predetermined amount of data with respect to the unread data in the order of reception, converts the read data into data for the USB device according to the USB protocol, transmits the converted data to the virtual USB device 13 (S202), and then recurses on S201 till a data transfer end instruction arrives.

When there are no unread data, the data transfer remote control unit 14 transmits data (dummy data) for the USB device that indicate the absence of the unread data to the virtual USB device 13 (S203) and then recurses on S201 till a data transfer end instruction arrives.

The virtual USB device 13 that has received the data transmitted from the data transfer remote control unit 14 transfers the received data to the application 11 via the USB driver 12. As a result, the application 11 can acquire and use the data of the USB device 40.

As described hereinabove, with the configuration according to the present embodiment, when the data received by the data transfer local control unit 22 from the USB device 40 are transmitted to the data transfer remote control unit 14, the data received from the USB device 40 are temporarily stored in the local temporary storage unit 23, and when the amount of data equal to or greater than the threshold is accumulated, the data are converted into data for the communication network 500 and transmitted to the data transfer remote control unit 14 instead of converting the data into the data for the communication network 500 and transmitting them to the data transfer remote control unit 14 each time the data are received from the USB device 40. Therefore, the number of conversions from the data for USB to the data for the communication network 500 can be reduced by comparison with the case in which the data are converted each time they are received. As a result, when the data of the USB device 40 are transferred to the remote computer 1, the decrease in communication performance caused by overhead or communication delay induced by the conversion can be reduced.

Further, the data transfer remote control unit 14 is configured to transmit the dummy data, without waiting for data transfer from the data transfer local control unit 22 (USB device 40), when no non-transferred data are stored in the remote temporary storage unit 15. Therefore, the application 11 (virtual USB device 13) maintains the connection state for receiving the data of the USB device 40 and can efficiently perform data communication.

Variation of Exemplary Embodiments

For example, a configuration is possible in which the USB device 40 is connected to the local computer 2 via a USB hub or the like, rather than directly. Further, a plurality of USB devices 40 can be connected to the local computer 2.

Further, for example, a configuration is possible in which when the data received by the data transfer remote control unit 14 from the data transfer local control unit 22 are stored in the remote temporary storage unit 15, the data are stored after being converted into data for the USB device according to the USB protocol. In this case, the data transfer remote control unit 14 can directly transmit the non-transferred data that have been read from the remote temporary storage unit 15 to the virtual USB device 13. With such a configuration, the number of conversions from the data for the communication network 500 to the data for USB in the remote computer 1 can be reduced. Therefore, the decrease in communication performance caused by overhead or communication delay induced by the conversion can be reduced.

Further, for example, the data transfer remote control unit 14 may be configured to transmit data to the application 11 not via the virtual USB device 13. In this case, the data transfer remote control unit 14 converts the data for the communication network 500, as necessary, into data in a format that can be processed by the application 11 when the data are stored in the remote temporary storage unit 15 or when the data are transmitted to the application 11.

In the above-described embodiment, a case is explained in which data of the USB device 40 are transferred from the local computer 2 to the remote computer 1. However, the present invention can be also applied to a case in which predetermined data are transferred from the remote computer 1 to the local computer 2 and written into the USB device 40. In this case, the data transfer remote control unit 14 is provided with functions (receiving the data transmitted from the virtual USB device 13 or the like, storing the received data in the remote temporary storage unit 15, and notifying, in response to the reception, the virtual USB device 13 or the like about the successful reception, and determining whether the amount of the non-transferred data that are stored in the remote temporary storage unit 15 is equal to or greater than a threshold and reading the non-transferred data that are stored in the remote temporary storage unit 15 when the amount of the non-transferred data is equal to or greater than the threshold, converting the read data to a format corresponding to the communication network 500, and transferring the converted data to the data transfer remote control unit 14) similar to those of the data transfer local control unit 22, while the data transfer local control unit 22 is provided with functions (receiving the data transmitted from the remote computer 1, storing the received data in the local temporary storage unit 23, reading the unread data that are stored in the local temporary storage unit 23 at a predetermined timing, and transmitting the data to the USB device 40 via the USB driver 21 in a data format for the USB device 40. When no unread data are present, dummy data are transmitted) similar to those of the data transfer remote control unit 14.

An exemplary advantage according to the invention is that it is not necessary to use a special device server and the decrease in communication performance caused by communication delay and overhead can be reduced.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary note 1) A data transfer system, comprising: a local control unit for acquiring data from a USB device connected to a local computer and transmitting the acquired data to a remote computer via a communication network; and a remote control unit for acquiring the data transmitted from the local control unit and transferring the acquired data to an application operating on the remote computer, wherein the local control unit has: a device control unit for receiving the data transmitted from the USB device to store the received data in a memory related to the local computer, and notifying, in response to the reception, the USB device about the successful reception; and a transfer control unit for determining whether an amount of the non-transferred data that are stored in the memory related to the local computer is equal to or greater than a threshold and, when the amount of the non-transferred data is equal to or greater than the threshold, reading the non-transferred data that are stored in the memory related to the local computer, converting the read data to a format corresponding to the communication network, and transferring the converted data to the remote computer, and the remote control unit has: a reception unit for receiving the data transmitted from the transfer control unit and storing the received data in a memory related to the remote computer; and a read control unit for reading the unread data that are stored in the memory related to the remote computer in response to a request from the application operating on the remote computer and transmitting the read data to the application in a format that can be processed by the application.

(Supplementary note 2) The data transfer system according to Supplementary note 1, wherein the read control unit transmits dummy data to the application when the unread data are not stored in the memory related to the remote computer.

(Supplementary note 3) The data transfer system according to Supplementary note 1, wherein the remote computer is a thin client server, and the local computer is a thin client terminal.

(Supplementary note 4) A local control unit configured to acquire data from a USB device connected to a local computer and transmit the acquired data to a remote computer via a communication network, the local control unit, comprising: a device control unit for receiving the data transmitted from the USB device to store the received data in a memory related to the local computer, and notifying, in response to the reception, the USB device about the successful reception; and a transfer control unit for determining whether an amount of the non-transferred data that are stored in the memory related to the local computer is equal to or greater than a threshold and, when the amount of the non-transferred data is equal to or greater than the threshold reading the non-transferred data that are stored in the memory related to the local computer, converting the read data to a format corresponding to the communication network, and transferring the converted data to the remote computer.

(Supplementary note 5) A remote control unit configured to acquire data from an USB device connected to a local computer via a communication network and transfer the acquired data to an application operating on a remote computer, the remote control unit, comprising: a reception unit for receiving the data transmitted from the local computer and storing the received data in a memory related to the remote computer; and a read control unit for reading the unread data that are stored in the memory related to the remote computer in response to a request from the application operating on the remote computer and transmitting the read data to the application in a format that can be processed by the application.

(Supplementary note 6) A data transfer system, comprising: local control means for acquiring data from a USB device connected to a local computer and transmitting the acquired data to a remote computer via a communication network: and remote control means for acquiring the data transmitted from the local control means and transferring the acquired data to an application operating on the remote computer, wherein the local control means has: device control means for receiving the data transmitted from the USB device to store the received data in a memory related to the local computer, and notifying, in response to the reception, the USB device about the successful reception; and transfer control means for determining whether an amount of the non-transferred data that are stored in the memory related to the local computer is equal to or greater than a threshold and, when the amount of the non-transferred data is equal to or greater than the threshold, reading the non-transferred data that are stored in the memory related to the local computer, converting the read data to a format corresponding to the communication network, and transferring the converted data to the remote computer, and the remote control means has: reception means for receiving the data transmitted from the transfer control means and storing the received data in a memory related to the remote computer; and read control means for reading the unread data that are stored in the memory related to the remote computer in response to a request from the application operating on the remote computer and transmitting the read data to the application in a format that can be processed by the application.

(Supplementary note 7) A local control unit configured to acquire data from a USB device connected to a local computer and transmit the acquired data to a remote computer via a communication network, the local control unit, comprising: device control means for receiving the data transmitted from the USB device to store the received data in a memory related to the local computer, and notifying, in response to the reception, the USB device about the successful reception: and transfer control means for determining whether an amount of the non-transferred data that are stored in the memory related to the local computer is equal to or greater than a threshold and, when the amount of the non-transferred data is equal to or greater than the threshold reading the non-transferred data that are stored in the memory related to the local computer, converting the read data to a format corresponding to the communication network, and transferring the converted data to the remote computer.

(Supplementary note 8) A remote control unit configured to acquire data from an USB device connected to a local computer via a communication network and transfer the acquired data to an application operating on a remote computer, the remote control unit, comprising: reception means for receiving the data transmitted from the local computer and storing the received data in a memory related to the remote computer; and read control means for reading the unread data that are stored in the memory related to the remote computer in response to a request from the application operating on the remote computer and transmitting the read data to the application in a format that can be processed by the application.

(Supplementary note 9) A data transfer method, comprising: acquiring, in a local computer, data from a USB device connected to the local computer and transmitting the acquired data to a remote computer via a communication network; and acquiring, in the remote computer, the data transmitted from the local computer and transferring the acquired data to an application operating on the remote computer, wherein said acquiring in the local computer includes: receiving the data transmitted from the USB device to store the received data in a memory related to the local computer, and notifying, in response to the reception, the USB device about the successful reception: and determining whether an amount of the non-transferred data that are stored in the memory related to the local computer is equal to or greater than a threshold and, when the amount of the non-transferred data is equal to or greater than the threshold, reading the non-transferred data that are stored in the memory related to the local computer, converting the read data to a format corresponding to the communication network, and transferring the converted data to the remote computer, and wherein said acquiring in the remote computer includes: receiving the data transmitted from the local computer and storing the received data in a memory related to the remote computer: and reading the unread data that are stored in the memory related to the remote computer in response to a request from the application and transmitting the read data to the application in a format that can be processed by the application.

(Supplementary note 10) A computer usable medium having computer readable code means embodied therein for executing said acquiring in the local computer in the data transfer method according to Supplementary note 9.

(Supplementary note 11) A computer usable medium having computer readable code means embodied therein for executing said acquiring in the remote computer in the data transfer method according to Supplementary note 9.

What is claimed is:

1. A data transfer system, comprising:
    a local control unit for acquiring data from a USB device connected to a local computer and transmitting the acquired data to a remote computer via a communication network; and
    a remote control unit for acquiring the data transmitted from the local control unit and transferring the acquired data to an application operating on the remote computer, wherein
    the local control unit has:
    a device control unit for receiving the data transmitted from the USB device to store the received data in a memory related to the local computer, and notifying, in response to the reception, the USB device about the successful reception; and
    a transfer control unit for determining whether an amount of the non-transferred data that are stored in the memory related to the local computer is equal to or greater than a threshold and, when the amount of the non-transferred data is equal to or greater than the threshold, reading the non-transferred data that are stored in the memory related to the local computer, converting the read data to a format corresponding to the communication network, and transferring the converted data to the remote computer, and
    the remote control unit has:
    a reception unit for receiving the data transmitted from the transfer control unit and storing the received data in a memory related to the remote computer; and
    a read control unit for reading the unread data that are stored in the memory related to the remote computer in response to a request from the application operating on the remote computer and transmitting the read data to the application in a format that can be processed by the application, and
    wherein the read control unit transmits dummy data to the application when unread data are not stored in the memory related to the remote computer.

2. The data transfer system according to claim 1, wherein the remote computer is a thin client server, and the local computer is a thin client terminal.

* * * * *